(12) United States Patent
Mori et al.

(10) Patent No.: US 9,413,566 B2
(45) Date of Patent: Aug. 9, 2016

(54) SIGNAL TRANSMISSION CIRCUIT

(71) Applicants: DENSO CORPORATION, Kariya, Aichi-pref. (JP); NIPPON SOKEN, INC., Nishio, Aichi-pref. (JP)

(72) Inventors: Hiroyuki Mori, Obu (JP); Keiji Shigeoka, Nishio (JP); Yoshifumi Kaku, Okazaki (JP); Shogo Akasaki, Kariya (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 14/812,447

(22) Filed: Jul. 29, 2015

(65) Prior Publication Data

US 2016/0036604 A1 Feb. 4, 2016

(30) Foreign Application Priority Data

Jul. 31, 2014 (JP) .................................. 2014-156242

(51) Int. Cl.
*H04L 25/03* (2006.01)
*H04L 25/02* (2006.01)

(52) U.S. Cl.
CPC .......... *H04L 25/0278* (2013.01); *H04L 25/029* (2013.01)

(58) Field of Classification Search
CPC . H04L 25/028; H04L 25/0278; H04L 25/029; H03K 17/16; H03K 19/00361
See application file for complete search history.

(56) References Cited

U.S. PATENT DOCUMENTS

| 5,576,642 A * | 11/1996 | Nguyen ........... H03K 19/00361 326/101 |
| 2007/0033512 A1* | 2/2007 | Johnson .................. G06F 11/10 714/801 |
| 2008/0048730 A1* | 2/2008 | Bae ...................... G06F 13/4072 327/64 |
| 2009/0052559 A1* | 2/2009 | Iwasaki ............... H04L 25/0292 375/257 |
| 2010/0177829 A1* | 7/2010 | Suzuki .................. H01L 27/092 375/257 |
| 2010/0315121 A1* | 12/2010 | Atrash ............... H03K 19/0005 326/30 |
| 2011/0169547 A1* | 7/2011 | Suzuki ............. H03K 19/00361 327/384 |
| 2012/0293230 A1* | 11/2012 | Mori ..................... H04L 25/026 327/313 |
| 2014/0056388 A1 | 2/2014 | Mori et al. |

FOREIGN PATENT DOCUMENTS

WO 2013/051677 A1 4/2013

* cited by examiner

*Primary Examiner* — Syed Haider
(74) *Attorney, Agent, or Firm* — Posz Law Group, PLC

(57) ABSTRACT

A signal transmission circuit includes a transceiver, an impedance adjustment circuit, a first control circuit and a second control circuit. The impedance adjustment circuit realizes a low impedance state and a normal state of the transmission line. The first control circuit controls the impedance adjustment circuit to realize the low impedance state for a fixed period that is shorter than a width of one bit, when a change of a signal level on the transmission line is detected. The second control circuit controls the impedance adjustment circuit according to a transmission data transmitted from the transceiver, when detecting that a communication frame wins an arbitration by comparing the transmission data and the received data, to realize the low impedance state in an entire period where the signal level on the transmission line is recessive until transmission of the communication frame ends.

9 Claims, 8 Drawing Sheets

SIGNAL TRANSMISSION CIRCUIT

CROSS REFERENCE TO RELATED APPLICATION

This application is based on Japanese Patent Application No. 2014-156242 filed on Jul. 31, 2014, the disclosure of which is incorporated herein by reference.

TECHNICAL FIELD

The present disclosure relates to a signal transmission circuit that reduces ringing in a wire communication.

BACKGROUND

In wire communications, generally, distortions of the waveforms occur due to ringing at rising edges and falling edges where data is switched between high level and low level. For example, in a CAN (controller area network) communication of an in-vehicle LAN (local area network), since an output terminal is in a high impedance state during recessive transmission, a large ringing is likely to easily occur. If a signal level is not settled to a level equal to or greater than, or equal to or lower than a threshold voltage for determining the high or low of the bit by a bit determination time point, erroneous determination of the bit is likely to occur. Therefore, arrangement or wiring scales of a communication system such as the number of nodes, the length of wirings, and the number of divergences, and a transmission rate are restricted depending on the occurrence of the ringing.

In order to suppress such ringing, it has been known to detect the switching of the signal level on a transmission line and to reduce the impedance of the transmission line only for a fixed period. Such a technique is, for example, disclosed in JP 2012-257205 A, which corresponds to US 2012/0293230 A1, as a ringing suppression circuit.

SUMMARY

In such a conventional technique, it is necessary to end up the period for keeping the transmission line in the low impedance state before the bit determination time point. Therefore, it is difficult to sufficiently suppress the ringing. That is, when the transmission line is in the low impedance state, there is a possibility that a dominant signal level is not sufficiently generated, resulting in the erroneous determination of the bit.

For example, in a CAN FD (i.e., CAN with flexible data rate) that increases the communication rate only in a data field of a communication frame, the width of one bit (1-bit width) in the data field is further shortened. With this, the period to set the transmission line in the low impedance state is further shortened, resulting in further deterioration of the effect of suppressing the ringing.

It is an object of the present disclosure to provide a signal transmission circuit capable of improving the effect of suppressing the ringing that is achieved by setting the transmission line in the low impedance state.

According to an aspect of the present disclosure, a signal transmission circuit includes a transceiver, an impedance adjustment circuit, a first control circuit, and a second control circuit. The transceiver encodes a transmission data and outputs the transmission data encoded to a transmission line. The transceiver also decodes a signal received from the transmission line to generate a received data. The impedance adjustment circuit realizes a low impedance state in which a resistor component is connected between a pair of signal lines of the transmission line, and a normal state in which the resistor component is disconnected from the pair of signal lines. When detecting a change of a signal level on the transmission line, the first control circuit controls the impedance adjustment circuit so that the transmission line is in the low impedance state for a fixed period that is set shorter than a width of one bit. When detecting that a communication frame wins an arbitration by comparing the transmission data and the received data, the second control circuit controls the impedance adjustment circuit according to the transmission data so that the transmission line is in the low impedance state in an entire period where the signal level on the transmission line is recessive, until transmission of the communication frame that won the arbitration ends.

In such a structure, effects similar to those of the conventional technique are achieved by the control of the first control circuit. Further, when the communication frame transmitted by the signal transmission circuit wins the arbitration, the transmission line can be set to the low impedance state in the entire period where the signal level on the transmission line is recessive by the control of the second control circuit. Therefore, the effect of suppressing the ringing can be effectively improved. Namely, when the communication frame wins the arbitration, the recessive transmitted by the signal transmission circuit is not rewritten to dominant, and the period where the signal level on the transmission line is recessive can be specified by the transmission data. Therefore, the impedance adjustment circuit can be controlled to realize the low impedance state in the entire period where the signal level on the transmission line is recessive.

For example, in a case of the CAN, when the data field is transmitted and received, the impedance adjustment circuit is always controlled by the second control circuit. Therefore, even in the CAN FD in which only the data field is increased in rate, the effect of suppressing the ringing can be achieved at the maximum.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, embodiments to which the present disclosure is employed will be described with reference to the drawings.

1. First Embodiment

[1.1. Entire Structure]

Figure 1:
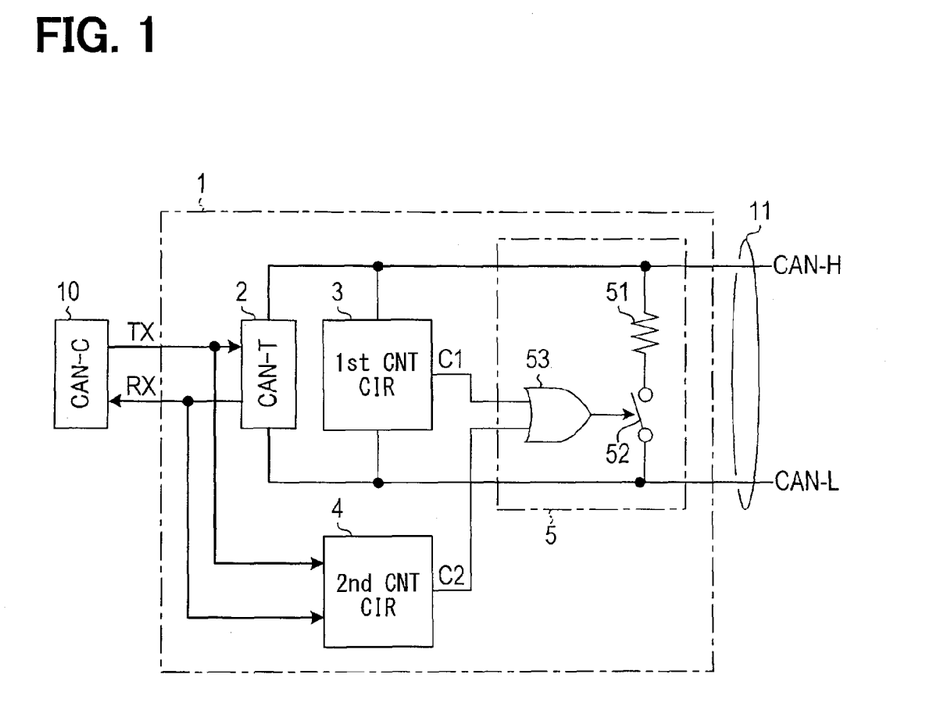
FIG. 1 is a block diagram illustrating a structure of a signal transmission circuit according to a first embodiment.

Referring to FIG. 1, a signal transmission circuit 1 encodes a transmission data TX supplied from a CAN controller 10 to a differential signal, and outputs the differential signal to a transmission line 11. Also, the signal transmission circuit 1 decodes the differential signal received from the transmission line 11 to a received data RX, and supplies the received data RX to the CAN controller 10.

Figure 4:
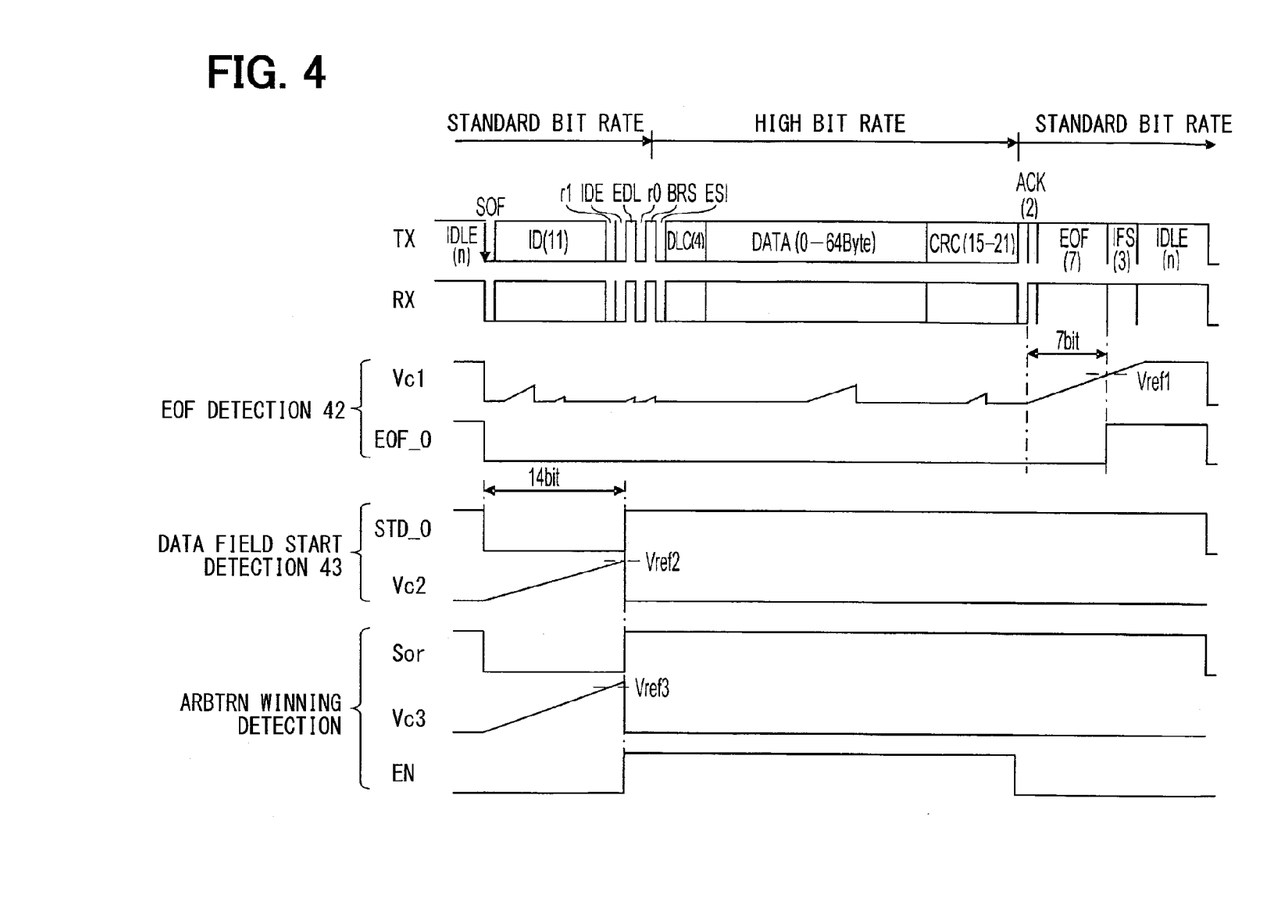
FIG. 4 is a time chart exemplifying an operation in a case of wining an arbitration.
Figure 5:
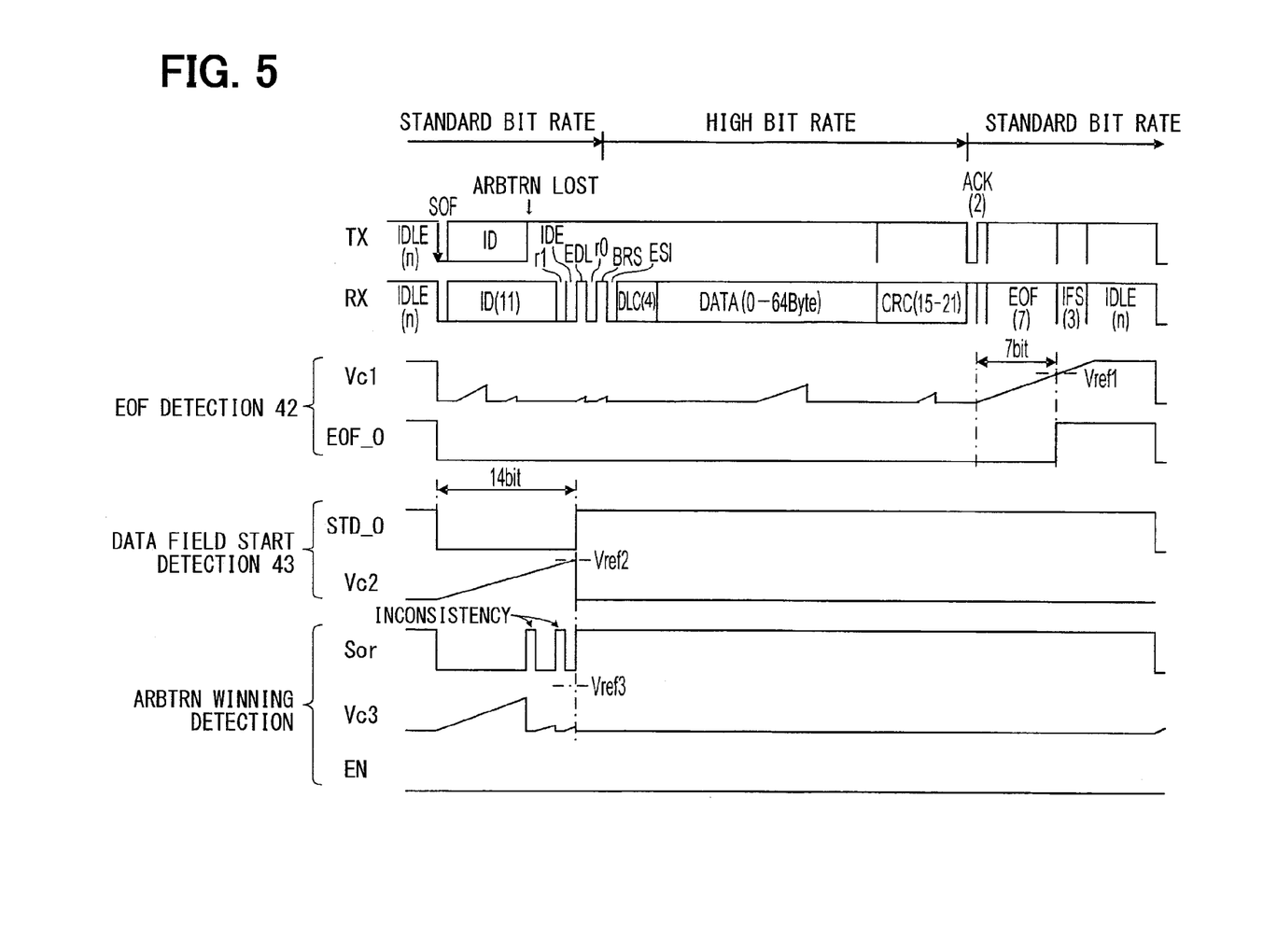
FIG. 5 is a time chart exemplifying an operation in a case of losing the arbitration.

The CAN controller 10 transmits and receives a communication frame (transmission data TX, received data RX) according to a known CAN protocol. The CAN controller 10 has a function of immediately stopping the transmission when detecting the losing of an arbitration while the CAN controller 10 is transmitting the communication frame. Note that the CAN controller 10 realizes CAN FD (CAN with flexible data rate) that changes a communication rate in the communication frame. Specifically, as shown in FIG. 4 and FIG. 5, the CAN controller 10 transmits a SOF (start of frame), an arbitration field, a first half of a control field, an ACK (acknowledgement) field, and an EOF (end of field) at a standard bit rate (e.g., 1 Mbps), and transmits a second half of the control field, a data field, and a CRC (cyclic redundancy check) field at a high bit rate (e.g., 2 Mbps).

As shown in FIG. 1, the transmission line 11 includes a pair of signal lines, such as a high potential signal line CAN-H and a low potential signal line CAN-L. The transmission line 11 transmits a differential signal provided by the CAN. A state where a potential difference between the signal line CAN-H and the signal line CAN-L is equal to or lower than a threshold is referred to as recessive, and a state where the potential difference between the signal line CAN-H and the signal line CAN-L is greater than the threshold is referred to as dominant. For example, the signal line CAN-H is driven at 2.5 V in the recessive, and is driven at 3.5 V or over in the dominant. The signal line CAN-L is driven at 2.5 V in the recessive, and is driven at 1.5 V or less in the dominant.

[1.2 Signal Transmission Circuit]

The signal transmission circuit 1 includes a CAN transceiver 2, a first control circuit 3, a second control circuit 4, and an impedance adjustment circuit 5.

[1.2.1. CAN Transceiver]

The CAN transceiver 2 encodes the transmission data TX to the differential signal, and decodes the differential signal to the received data RX. The signal levels of the transmission data TX and the received data RX and the differential signal have relationship that "1" corresponds to the recessive and "0" corresponds to the dominant. The differential signal of the transmission line 11 is recessive when a plurality of CAN transceivers 2 connected to the transmission line 11 all outputs the recessive. The differential signal of the transmission line 11 is dominant when any of the plurality of CAN transceiver 2 outputs the dominant.

[1.2.2. First Control Circuit]

The first control circuit 3 monitors the differential signal on the transmission line 11. When the first control circuit 3 detects the change of the differential signal from the dominant to the recessive, the first control circuit 3 generates a first control signal C1 that is at a high level for a fixed period. The fixed period is set based on a period from a bit boundary to a sampling point to determine the signal level of the bit (e.g., ¾ of 1 bit), and is shorter than the period. As the first control circuit 3, for example, a circuit disclosed in US2012/0293230 A1 (JP2012-257205A) can be used, as incorporation by reference. The fixed period is variably set according to the baud rate.

[1.2.3. Second Control Circuit]

Figure 2:
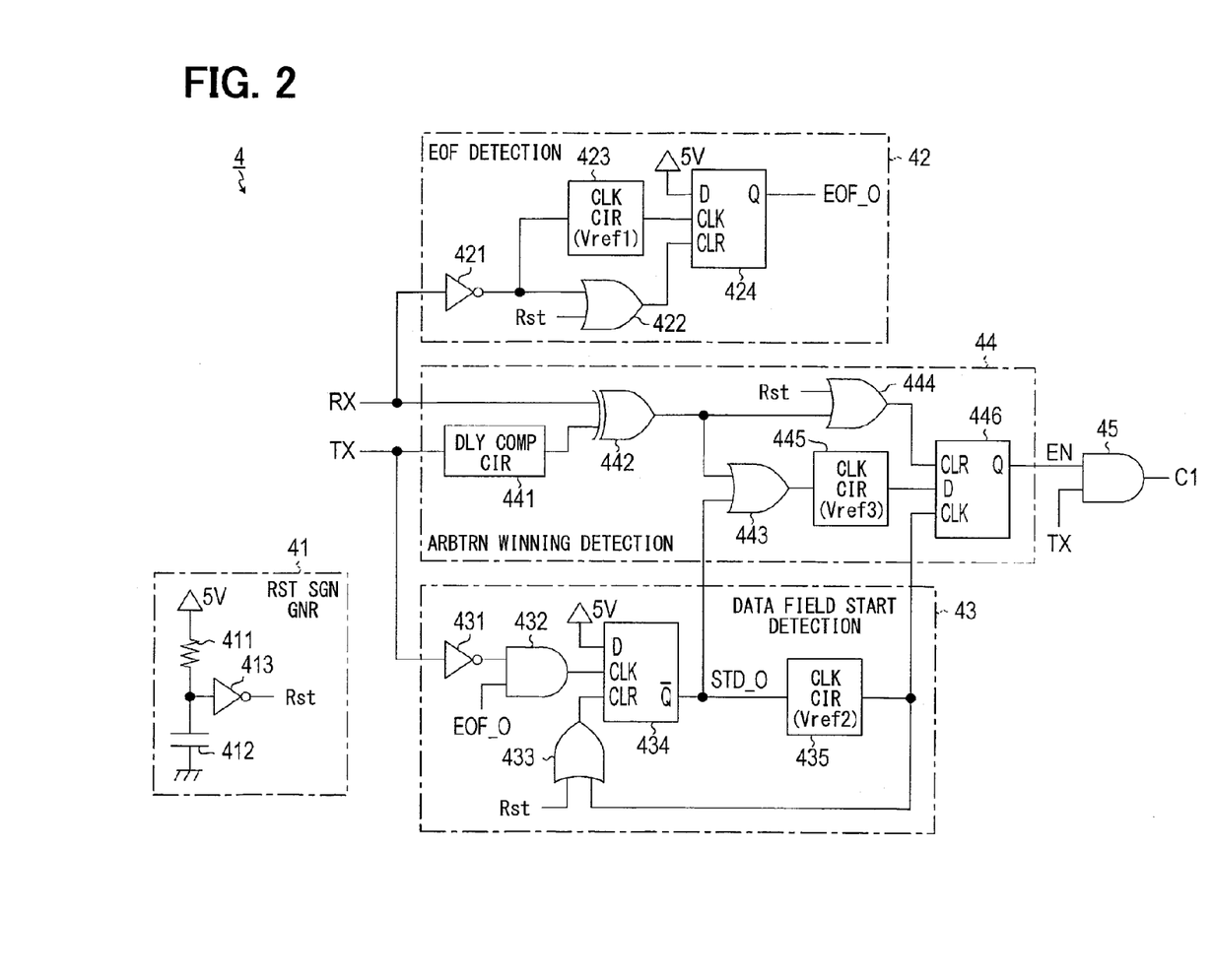
FIG. 2 is a block diagram illustrating a structure of a second control circuit of the signal transmission circuit.

As shown in FIG. 2, the second control circuit 4 includes a reset signal generation portion 41, an EOF detection portion 42, a data field start detection portion 43, an arbitration winning detection portion 44, and an output portion 45.

The reset signal generation portion 41 includes a resistor 411, a capacitor 412, and an inverting circuit (NOT circuit) 413. An input terminal of the NOT circuit 413 is connected to a power source (5V) through the resistor 411, and is grounded through a capacitor 412. The NOT circuit 413 outputs a reset signal Rst. Namely, the reset signal generation circuit 41 outputs the reset signal Rst that is at a high level in a period from the time the power source is turned on to the time a voltage between both ends of the capacitor 412 (hereinafter referred to as the both-end voltage) exceeds a threshold voltage of the NOT circuit 413.

The EOF detection portion 42 includes a NOT circuit 421, an OR circuit 422, a clock circuit 423, and a latch circuit 424. The NOT circuit 421 inverts a signal level of the received data RX. When the output of the NOT circuit 421 is at a high level (the received data RX is at the low level/dominant), an internal state of the clock circuit 423 is reset, and the clock circuit 423 outputs a signal at a low level. When the output of the NOT circuit 421 is kept at the low level (the received data RX is at the high level/recessive) for the 7-bits width or more at the standard bit rate, the output of the clock circuit 423 changes to the high level.

The OR circuit 422 receives the output of the NOT circuit 421 and the reset signal Rst. When the received data RX is at the low level or when the reset signal Rst is at the high level, the output of the OR circuit 422 is at the high level. When the output of the OR circuit 422 is at the high level, the latch circuit 424 is reset.

The latch circuit 424 outputs an EOF detection signal EOF_O that changes from the low level to the high level when the output of the clock circuit 423 is changed from the low level to the high level. That is, the EOF detection signal EOF_O changes to the high level when the high level (recessive) of the received data RX is detected continuously seven bits or more, that is, when the EOF indicating the end of the communication frame is detected. Thereafter, the EOF detection signal EOF_O changes to the low level when the SOF indicating the start of the communication frame is detected. (See FIG. 4 and FIG. 5).

The data field start detection portion 43 includes a NOT circuit 431, an AND circuit 432, an OR circuit 433, a latch circuit 434 and a clock circuit 435. The NOT circuit 431 inverts the transmission data TX. When the output of the NOT circuit 431 and the EOF detection signal EOF_O are both at the high level, the output of the AND circuit 432 changes to the high level. When either the reset signal Rst or the output of the clock circuit 435 is at the high level, the output of the OR circuit 433 is at the high level.

The latch circuit 434 is reset when the output of the OR circuit 433 is at the high level. When the latch circuit 434 is reset, the output of the latch circuit 434 is at the high level. When the output of the AND circuit 432 changes from the low level to the high level, the output of the latch circuit 434 changes to the low level. Hereinafter, the output of the latch circuit 434 is referred to as a reference time signal STD_O.

When the reference time signal STD_O is at the high level, the internal state of the clock circuit 435 is reset and the output of the clock circuit 435 is at the low level. The output of the clock circuit 435 changes to the high level when a period corresponding to the 14-bits width at the standard bit rate elapses after the reference time signal STD_O is changed to the low level, that is, after the SOF is detected. When the output of the clock circuit 435 is changed to the high level, the latch circuit 434 is reset. With this, the reference time signal STD_O changes to the high level, and the output of the clock circuit 435 changes to the low level. (See FIG. 4 and FIG. 5). Namely, the high level signal outputted from the clock circuit 435 has a pulse shape. The time point indicated by the output of the clock circuit 435 is hereinafter referred to as an arbitration result determination timing.

The arbitration winning detection portion 44 includes a delay compensation circuit 441, an exclusive OR circuit (XOR circuit) 442, OR circuits 443, 444, a clock circuit 445 and a latch circuit 446. Since the received data RX is delayed relative to the transmission data TX, the delay compensation circuit 441 delays the output of the transmission data TX so as to coincide the transmission data TX and the received data RX. When the transmission data TX delayed and the received data RX do not coincide, that is, when the own device is transmitting the communication frame and loses the arbitration, or when the own device succeeds the transmission and receives the ACK, the output of the XOR circuit 442 is at the high level.

The output of the OR circuit 443 is at the low level, when the reference time signal STD_O and the output of the XOR circuit 442 are both at the low level. The output of the OR circuit 443 is at the high level except for the above case, that is, except when the reference time signal STD_O and the output of the XOR circuit 442 are both at low level.

When the output of the OR circuit 443 is at the high level, the internal state of the clock circuit 445 is reset and the output of the clock circuit 445 is at the low level. The output of the clock circuit 445 changes to the high level when the output of the OR circuit 443 has changed to the low level and is kept at the low level for a period corresponding to the 14-bits width or more at the standard bit rate. Namely, the clock circuit 445 effectively operates only in a period where the reference time signal STD_O is at the low level (i.e., a period from the time the SOF is detected to the time the start of the data field is detected). Further, when it keeps to win the arbitration in the period, the output of the clock circuit 445 changes to the high level.

The output of the OR circuit 444 is at the high level when either the reset signal Rst or the output of the XOR circuit 442 is at the high level. The latch circuit 446 is reset when the output of the OR circuit 444 is at the high level. When the latch circuit 446 is reset, the output of the latch circuit 446 is at the low level. The latch circuit 446 latches and outputs the output of the clock circuit 445 at a time point where the output of the clock circuit 435 is changed from the low level to the high level, that is, at the arbitration result determination timing. That is, the latch circuit 446 outputs an enabling signal EN that is at a high level in a period from the arbitration result determination timing to the time the ACK is detected, when the belonging device performs the transmission and wins the arbitration.

The output portion 45 is provided by an AND circuit that outputs a high level signal when the enabling signal EN and the transmission data TX are both at the high level, and the output of the AND circuit corresponds to a second control signal C2. That is, the second control signal C2 is kept at the low level in a period the enabling signal EN is at the low level, and is the same as the transmission data TX in a period where the enabling signal EN is at the high level.

Hereinafter, the clock circuits 423, 445 and 435 will be described in detail. The clock circuits 423, 445 and 435 have the same structure. Therefore, the clock circuits 423, 445 and 435 will be hereinafter mentioned as the clock circuit 8 when it is not necessary to discriminate.

Figure 3:
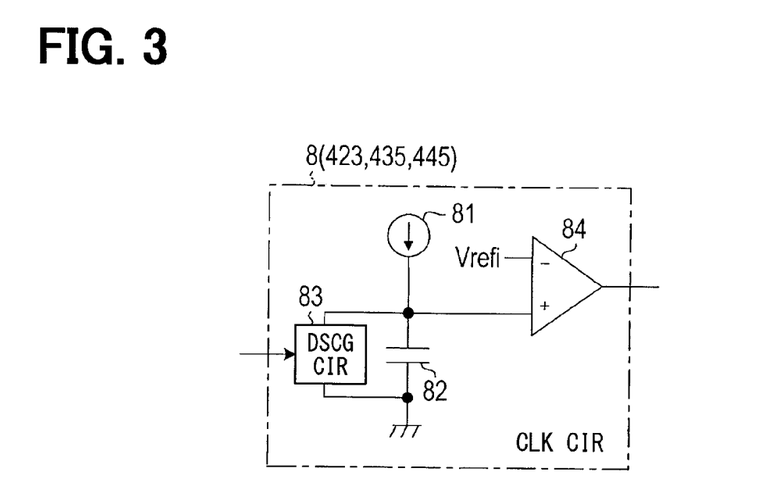
FIG. 3 is a block diagram illustrating a structure of a clock circuit of the second control circuit.

As shown in FIG. 3, the clock circuit 8 includes a constant current circuit 81, a capacitor 82, a discharge circuit 83 and a comparator 84. The constant current circuit 81 charges the capacitor 82 with a constant current set beforehand. The discharge circuit 83 discharges the charges of the capacitor 82 by short-circuiting the ends of the capacitor 82 when the signal inputted to the clock signal 8 is at the high level. The comparator 84 compares the both-end voltage of the capacitor 82 with a predetermined threshold Vrefi. When the both-end voltage of the capacitor 82 is higher than the threshold Vrefi, the output of the comparator 84 is at the high level. The output of the comparator 84 is the output of the clock circuit 8. The threshold Vrefi is suitably set according to the length of time to be measured, the magnitude of the constant current flowing from the constant current circuit 81, and the capacitance of the capacitor 82. Hereinafter, the threshold of the clock circuit 423 will be referred to as the threshold Vref1, the threshold of the clock circuit 445 will be referred to as the threshold Vref2, and the threshold of the clock circuit 435 will be referred to as the threshold Vref3.

[1.2.4. Operation of Second Control Circuit]

An operation of the second control circuit 4 will be described with reference to FIG. 4 and FIG. 5.

As shown in FIG. 4 and FIG. 5, in the EOF detection portion 42, the capacitor voltage Vc1 of the clock circuit 423 increases at a constant rate in a period where the received data RX is at the high level (recessive), and is reset (cleared to zero) when the received data RX changes to the low level (dominant). When the period corresponding to the 7-bits width at the standard bit rate elapses without the capacitor voltage Vc1 being reset, the capacitor voltage Vc1 exceeds the threshold Vref1, and thus the detection signal EOF_O of the EOF detection portion 42 changes to the high level. The EOF can be detected in such a way because only the EOF keeps the recessive for seven bits or more during the communication frame, according to the regulation of the CAN.

In the data field start detection portion 43, the reference time signal STD_O is at the high level in an idling state of a bus after the detection of the EOF, and changes to the low level when the SOF is detected thereafter. The capacitor voltage Vc2 of the clock circuit 435 increases at a constant rate in a period where the reference time signal STS_O is at the low level, and is reset when the reference time signal STD_O changes to the high level. When the period corresponding to the 14-bits width at the standard bit rate elapses after the reference time signal STD_O changes from the high level to the low level, the capacitor voltage Vc2 reaches the threshold Vref2. Thus, the output of the clock circuit 435 changes to the high level, and the reference time signal STD_O changes to the high level. As such, the reference time signal STD_O that is at the low level in the period for the 14-bits width from the SOF is generated.

In the arbitration winning detection portion 44, the logical sum of the reference time signal STD_O and a coinciding signal that is at the high level when the transmission data TX and the received data RX do not coincide is inputted to the clock circuit 445. The capacitor voltage Vc3 of the clock circuit 445 increases at a constant rate in a period where the input signal Sor is at the low level, and is reset when the input signal Sor changes to the high level.

However, the input signal of the clock circuit 445 is the same as the reference time signal STD_O, as shown in FIG. 4, when the own device wins the arbitration. Since the capacitor voltage Vc3 of the clock circuit 445 reaches the threshold Vref3 in the period where the input signal Sor is at the low level, the output of the clock circuit 445 changes to the high level. As a result, the enabling signal EN also changes to the high level. The enabling signal EN changes to the low level when the ACK is detected.

On the other hand, in the case where the own device loses the arbitration, as shown in FIG. 5, the input signal Sor of the clock circuit 445 is at the high level in a period where the transmission data TX and the received data RX are detected as inconsistent even when the standard signal STD_O is at the low level. The capacitor voltage Vc3 of the clock circuit 445 is reset each time the inconsistency of the transmission data TX and the received data RX is detected. As such, the capacitor voltage Vc3 of the clock circuit 445 cannot reach the threshold Vref3 at the timing where the reference time start signal STD_O changes from the low level to the high level. As a result, the enabling signal EN is kept at the low level.

[1.2.5. Impedance Adjustment Circuit]

As shown in FIG. 1, the impedance adjustment circuit 5 includes a resistor 51, a switch 52 and an OR circuit 53. An end of the resistor 51 is connected to the signal line CAN-H, and the other end of the resistor 51 is connected to the signal line CAN-L through the switch 52. The OR circuit 53 receives the first control signal C1 outputted from the first control circuit 3 and the second control signal C2 outputted from the second control circuit 4. When either the first control signal C1 or the second control signal C2 is at the high level, the output of the OR circuit 53 is at the high level. When the output of the OR circuit 53 is at the high level, the switch 52 is turned on, and thus the transmission line 11 is brought into the low impedance state.

[1.3. Entire Operation]

In a case where the CAN controller 10 is not outputting the transmission data TX, the second control signal C2 is always at the low level. Therefore, the switch 52 is operated according to the first control signal C1. That is, when the differential signal on the transmission line 11 is changed from the dominant to the recessive, the switch 52 is turned on only for the fixed period that is shorter than the 1-bit width and the transmission line 11 is kept in the low impedance state.

In a case where the CAN controller 10 outputs the transmission data TX and loses the arbitration, the second control signal C2 is always at the low level. Thus, the switch 52 is operated in the similar manner to the operation when the CAN controller 10 is not outputting the transmission data TX. On the other hand, when the CAN controller 10 wins the arbitration, the second control signal C2 is at the same signal level as the transmission data TX in a period from the start of the data field to the time the ACK is received. That is, in this period, the switch 52 is on in an entire period where the differential signal on the transmission line 11 is recessive, and the transmission line 11 is kept in the low impedance state.

[1.4. Effects]

Figure 6A:
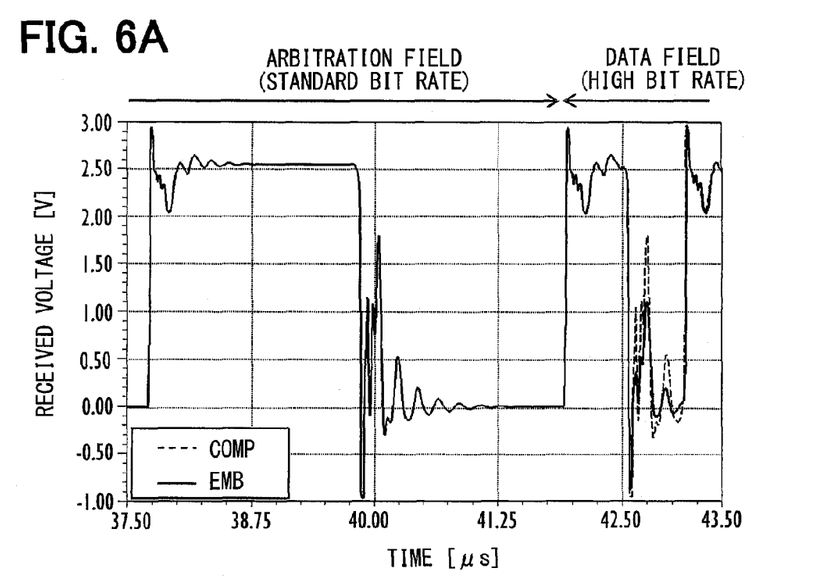
FIG. 6A is a graph illustrating a waveform of a differential signal in which an arbitration field at a standard bit rate and a data field at a high bit rate are indicated with the same time scale.
Figure 6B:
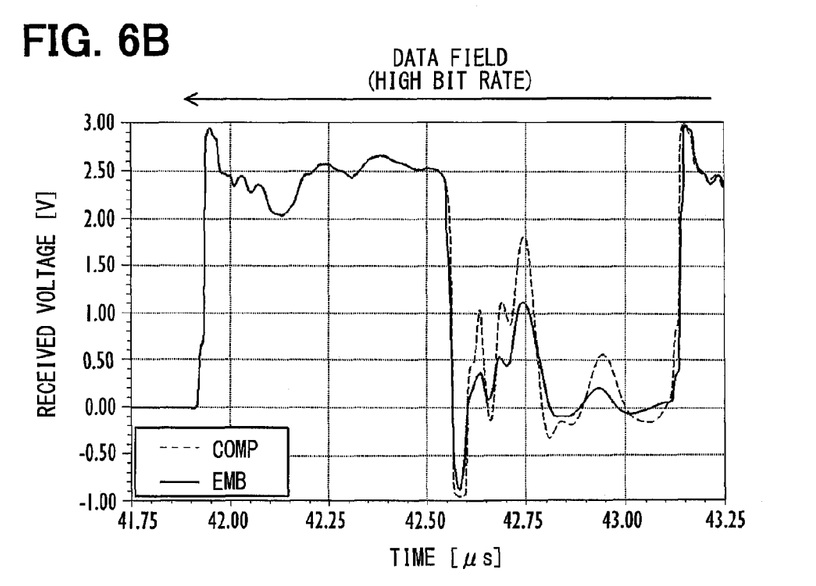
FIG. 6B is a graph illustrating a waveform of a differential signal in which only a data field is indicated with an enlarged time scale.

As described above, the signal transmission circuit 1 can achieve the similar effects as the conventional technique by the control of the first control circuit 3. Further, in the signal transmission circuit 1, when the CAN controller 10 to which the signal transmission circuit 1 belongs to outputs the transmission data TX as a belonging node (own node) and wins the arbitration, the transmission line 11 is set to the low impedance state in the entire period where the signal level on the transmission line 11 is recessive by the control of the second control circuit 4. Therefore, the effect of suppressing the ringing can be achieved to the maximum (see FIG. 6A and FIG. 6B). In FIG. 6A and FIG. 6B, a waveform in a solid line corresponds to the present embodiment, and a waveform in a dashed line corresponds to the conventional technique (ringing suppression circuit) as a comparative example to the present embodiment.

That is, in the case of winning the arbitration, the recessive outputted from the belonging node is not rewritten to the dominant, and the period where the signal level on the transmission line 11 is recessive can be specified from the transmission data TX. Therefore, the impedance adjustment circuit 5 can be controlled so that the transmission line 11 is set to the low impedance state in the entire period where the signal level on the transmission line 11 is recessive.

In the present embodiment, for example, the arbitration winning detection portion 44 corresponds to an arbitration determination portion. The EOF detection portion 42 and the data field start detection portion 43 correspond to a data field detection portion.

2. Second Embodiment

A basic structure of the second embodiment is similar to that of the first embodiment. Therefore, the description of the similar structure will not be repeated, and differences will be mainly described.

[2.1. Structure]

In the signal transmission circuit 1 of the present embodiment, only an impedance adjustment circuit 5a is different from the impedance adjustment circuit 5 of the first embodiment.

Figure 7:
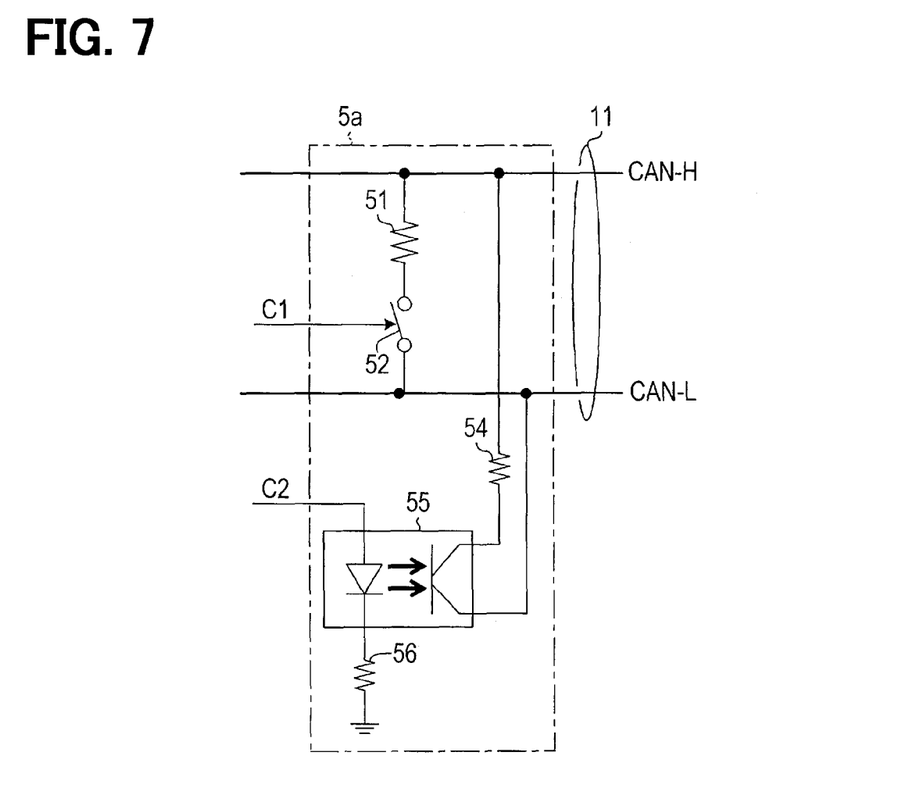
FIG. 7 is a circuit diagram illustrating a structure of an impedance adjustment circuit according to a second embodiment.

As shown in FIG. 7, the impedance adjustment circuit 5a of the present embodiment has resistors 54 and 56 and a photo coupler 55, in place of the OR circuit 53, as compared with the impedance adjustment circuit 5 of the first embodiment. Note that the operation (on and off) of the switch 52 is controlled according to the first control signal C1.

An end of the resistor 54 is connected to the signal line CAN-H, and the other end of the resistor 54 is connected to the signal line CAN-L through a phototransistor of the photo coupler 55. An anode of a photodiode of the photo coupler 55 is applied with the second control signal C2. A cathode of the photodiode of the photo coupler 55 is grounded through the resistor 56.

In the impedance adjustment circuit 5a, the resistor 51 is connected between the signal line CAN-H and the signal line CAN-L when the first control signal C1 is at the high level, and the resistor 54 is connected between the signal line CAN-H and the signal line CAN-L when the second control signal C2 is at the high level, to lower the impedance of the transmission line 11.

[2.2. Effects]

The present embodiment achieves the effects similar to those of the first embodiment described hereinabove.

3. Other Embodiments

The embodiments of the present disclosure are described hereinabove. However, the present disclosure is not limited to the embodiments described hereinabove, and may be modified in various other ways.

Figure 8A:
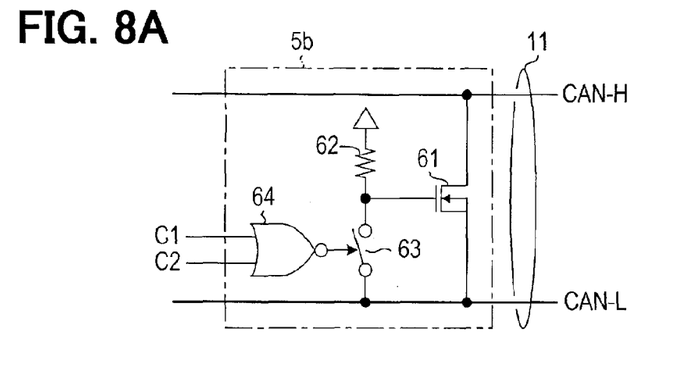
FIGS. 8A to 8C are circuit diagrams illustrating modifications of the impedance adjustment circuit.
Figure 8B:
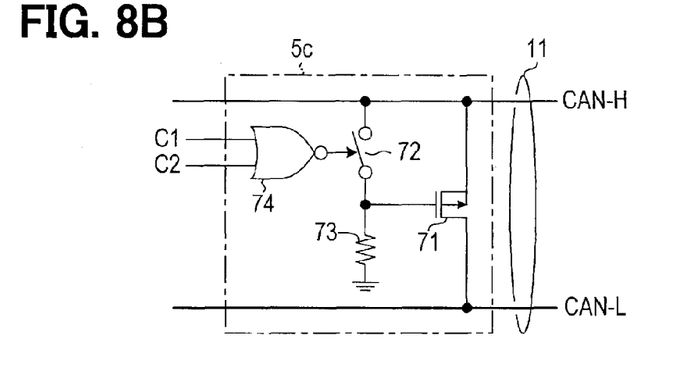
Figure 8C:
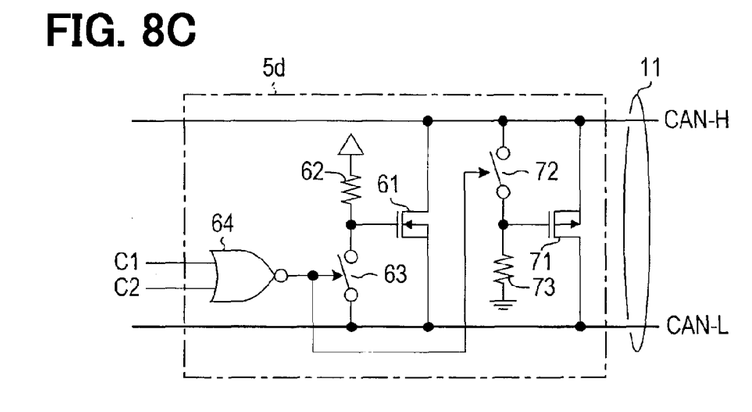

(1) In the embodiments described hereinabove, the impedance adjustment circuits 5, 5a are used. Alternative to the impedance adjustment circuits 5, 5a, impedance adjustment circuits 5b to 5d as shown in FIGS. 8A to 8C may be used. The impedance adjustment circuits 5b to 5d utilize an on-state resistance of a MOS transistor, in place of the resistor 51.

The impedance adjustment circuit 5b shown in FIG. 8A includes an NMOS transistor 61, a resistor 62, a switch 63 and a NOR circuit 64. A drain of the NMOS transistor 61 is connected to the signal line CAN-H, and a source of the NMOS transistor 61 is connected to the signal line CAN-L. A gate of the NMOS transistor 61 is connected to the power source through the resistor 62 and to the signal line CAN-L through the switch 63. The switch 63 is controlled by the output of the NOR circuit 64 that receives the first control signal C1 and the second control signal C2. When the output of the NOR circuit 64 is at the high level, the switch 63 is turned on.

In this case, when the switch 63 is turned on, the NOMS transistor 61 is turned off. Therefore, the transmission line 11 is in a normal impedance state. When the switch 63 is turned off, the NMOS transistor 61 is turned on. Therefore, the transmission line 11 is in the low impedance state.

The impedance adjustment circuit 5c shown in FIG. 8B includes a PMOS transistor 71, a switch 72, a resistor 73 and a NOR circuit 74. A source of the PMOS transistor 71 is connected to the signal line CAN-H, and a drain of the PMOS transistor 71 is connected to the signal line CAN-L. A gate of the PMOS transistor 71 is connected to the signal line CAN-H through the switch 72, and is grounded through the resistor 73. The switch 72 is controlled by the output of the NOR circuit 74 that receives the first control signal C1 and the second control signal C2. The switch 72 is turned on when the output of the NOR circuit 74 is at the high level.

In this case, when the switch 72 is turned on, the PMOS transistor 71 is turned off. Therefore, the transmission line 11 is in the normal impedance state. When the switch 72 is turned off, the PMOS transistor 71 is turned on. Therefore, the transmission line 11 is in the low impedance state.

The impedance adjustment circuit 5d shown in FIG. 8C is provided by adding the PMOS transistor 71, the switch 72 and the resistor 73, which are similar to the impedance adjustment circuit 5c, to the impedance adjustment circuit 5b. The switch 72 is controlled by the output of the NOR circuit 64.

Even when these impedance adjustment circuits 5d to 5d are used, the effects similar to those of the first embodiment will also be achieved. Note that the ground potential may be different depending on the node. Therefore, when the MOS transistors 61 and 71 are controlled to be turned on or off relative to the ground or the potential of the power source as the reference, there is a possibility that the MOS transistors 61 and 71 are not sufficiently turned on or off. On the other hand, in the impedance adjustment circuit 5c, even if the ground potential is shifted in any way, one of the MOS transistors 61 and 71 is surely turned on. Therefore, the transmission line 11 can be surely brought into the low impedance state.

(2) The function of one structural element of the embodiments described hereinabove may be divided into a plurality of structural elements, or functions of the plurality of structural elements of the embodiments described hereinabove may be combined to one structural element. At least a part of the structure of the embodiments described above may be replaced with a known structure having the same function. A part of the structure of the embodiments described above may be eliminated. At least a part of the structure of the embodiments described above may be added to the structure of the other embodiment, or replaced with a structure of the other embodiment.

(3) In the embodiments described hereinabove, the present disclosure is realized as the signal transmission circuit. However, the present disclosure may be realized in any modes such as a system having the signal transmission circuit as a structural element.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A signal transmission circuit connected to a transmission line that includes a pair of signal lines and transmits a differential signal changing between binary levels of recessive and dominant, the signal transmission circuit comprising:
    a transceiver that encodes a transmission data, transmits the transmission data to the transmission line, and decodes a signal received from the transmission line to generate a received data;
    an impedance adjustment circuit that realizes a low impedance state of the transmission line by connecting a resistance component between the pair of signal lines and a normal state of the transmission line by disconnecting the resistance component;
    a first control circuit that controls the impedance adjustment circuit to realize the low impedance state for a fixed period that is shorter than a width of one bit, when a change of a signal level on the transmission line is detected; and
    a second control circuit that controls the impedance adjustment circuit according to the transmission data, when detecting that a communication frame wins an arbitration by comparing the transmission data and the received data, to realize the low impedance state in an entire period where a signal level on the transmission line is recessive until transmission of the communication frame winning the arbitration ends.

2. The signal transmission circuit according to claim 1, wherein
    the impedance adjustment circuit includes a resistor and a switching circuit, the switching circuit causing the resistor to be connected between the pair of signal lines in a period of receiving a command for realizing the low impedance state from at least one of the first control circuit and the second control circuit.

3. The signal transmission circuit according to claim 1, wherein
    one of the pair of signal lines is a high potential signal line and the other of the pair of signal line is a low potential signal line having a potential lower than the high potential signal line,
    the impedance adjustment circuit includes:
        an NMOS transistor that has a gate connected to a potential of a power source, a drain connected to the high potential signal line, and a source connected to the low potential signal line; and
        a switching circuit that causes the NMOS transistor to be in an on state in a period of receiving a command for realizing the low impedance state from at least one of the first control circuit and the second control circuit.

4. The signal transmission circuit according to claim 1, wherein
one of the pair of signal lines is a high potential signal line and the other of the pair of signal line is a low potential signal line having a potential lower than the high potential signal line,
the impedance adjustment circuit includes:
a PMOS transistor that has a gate connected to a potential of a power source, a drain connected to the low potential signal line, and a source connected to the high potential signal line; and
a switching circuit that causes the PMOS transistor to be in an on state in a period of receiving a command for realizing the low impedance state from at least one of the first control circuit and the second control circuit.

5. The signal transmission circuit according to claim 1, wherein
one of the pair of signal lines is a high potential signal line and the other of the pair of signal line is a low potential signal line having a potential lower than the high potential signal line,
the impedance adjustment circuit includes:
an NMOS transistor that has a gate connected to a potential of a power source, a drain connected to the high potential signal line, and a source connected to the low potential signal line;
a PMOS transistor that has a gate connected to the potential of the power source, a drain connected to the low potential signal line, and a source connected to the high potential signal line; and
a switching circuit that causes the NMOS transistor and the PMOS transistor to be in an on state in a period of receiving a command for realizing the low impedance state from at least one of the first control circuit and the second control circuit.

6. The signal transmission circuit according to claim 2, wherein
the switching circuit includes a photo coupler.

7. The signal transmission circuit according to claim 1, wherein
the impedance adjustment circuit includes a first adjustment circuit that is controlled by the first control circuit, and a second adjustment circuit that is controlled by the second control circuit.

8. The signal transmission circuit according to claim 1, wherein
the second control circuit includes:
an arbitration determination portion that compares a signal level of the transmission data and a signal level of the received data in an arbitration field that is at a first half of the communication frame, and determines that the communication frame wins the arbitration when a state where the signal level of the transmission data and the signal level of the received data coincide is kept for a first threshold period or more;
a data field detection portion that detects a period of a data field following the arbitration field in the communication frame; and
an output portion that outputs the transmission data as a command for controlling the impedance adjustment circuit during the period of the data field detected by the data field detection portion, when the arbitration determination portion determines that the communication frame wins the arbitration.

9. The signal transmission circuit according to claim 8, wherein
the data field detection portion detects a period from a time the arbitration determination portion determines that the communication frame wins the arbitration to a time an acknowledgement bit in which a signal level is rewritten by a communication node receiving the communication frame, as the period of the data field.

* * * * *